(12) United States Patent
Claudatos et al.

(10) Patent No.: US 8,667,591 B1
(45) Date of Patent: *Mar. 4, 2014

(54) COMMONALITY FACTORING REMEDIATION

(75) Inventors: Christopher Hercules Claudatos, San Jose, CA (US); William Dale Andruss, Minneapolis, MN (US); Michael John Dutch, Saratoga, CA (US); Vageesha Bhat, Bangalore (IN)

(73) Assignee: EMC Corporation, Hopkinton, MA (US)

( * ) Notice: Subject to any disclaimer, the term of this patent is extended or adjusted under 35 U.S.C. 154(b) by 509 days.

This patent is subject to a terminal disclaimer.

(21) Appl. No.: 12/493,144

(22) Filed: Jun. 26, 2009

Related U.S. Application Data

(60) Provisional application No. 61/075,854, filed on Jun. 26, 2008.

(51) Int. Cl.
*G06F 11/00* (2006.01)

(52) U.S. Cl.
USPC .......................................................... 726/24

(58) Field of Classification Search
USPC ...................................... 726/22–25; 713/188
See application file for complete search history.

(56) References Cited

U.S. PATENT DOCUMENTS

| 5,452,442 | A  | * | 9/1995  | Kephart ......................... 714/38.1 |
| 6,094,731 | A  | * | 7/2000  | Waldin et al. .............. 714/38.14 |
| 7,349,931 | B2 |   | 3/2008  | Horne |
| 7,454,418 | B1 |   | 11/2008 | Wang |
| 7,636,856 | B2 |   | 12/2009 | Georghescu et al. |
| 7,730,538 | B2 |   | 6/2010  | Fries et al. |
| 7,797,748 | B2 |   | 9/2010  | Zheng et al. |
| 7,917,481 | B1 | * | 3/2011  | Kale et al. ...................... 707/693 |
| 7,941,459 | B1 | * | 5/2011  | Erickson ........................ 707/803 |
| 7,962,956 | B1 | * | 6/2011  | Liao et al. ......................... 726/22 |
| 2003/0046558 | A1 | * | 3/2003 | Teblyashkin et al. .......... 713/188 |
| 2004/0010732 | A1 | * | 1/2004 | Oka ................................. 714/13 |
| 2004/0083381 | A1 | * | 4/2004 | Sobel et al. .................... 713/200 |
| 2005/0050335 | A1 | * | 3/2005 | Liang et al. .................... 713/188 |
| 2005/0120238 | A1 | * | 6/2005 | Choi ............................... 713/200 |
| 2005/0132206 | A1 | * | 6/2005 | Palliyil et al. ................. 713/188 |
| 2005/0240813 | A1 | * | 10/2005 | Okada et al. ..................... 714/14 |
| 2006/0161984 | A1 |   | 7/2006  | Phillips et al. |
| 2006/0235821 | A1 | * | 10/2006 | Armangau et al. ............... 707/1 |
| 2007/0100905 | A1 | * | 5/2007 | Masters et al. ................ 707/201 |
| 2007/0266436 | A1 | * | 11/2007 | Ballard et al. ................... 726/24 |
| 2007/0288536 | A1 | * | 12/2007 | Sen et al. ....................... 707/204 |
| 2008/0077987 | A1 |   | 3/2008  | Hanes |
| 2008/0141373 | A1 | * | 6/2008 | Fossen et al. .................... 726/23 |
| 2008/0141375 | A1 | * | 6/2008 | Amundsen ....................... 726/24 |
| 2008/0148403 | A1 | * | 6/2008 | Manion et al. .................. 726/22 |
| 2009/0089880 | A1 |   | 4/2009  | Kobayashi et al. |
| 2010/0071064 | A1 |   | 3/2010  | Weber |

* cited by examiner

*Primary Examiner* — Darren B Schwartz

(74) *Attorney, Agent, or Firm* — Theodore A. Chen; Krishnendu Gupta

(57) ABSTRACT

The disclosure relates to a method and system for processing objects stored as blocks on a storage system. The blocks are in deduplicated form. The blocks are scanned for a pattern, and if a pattern is found in a block, objects associated with the block are identified. The pattern may be a malware signature. The block is remediated, and the associated objects may be remediated as well, in the storage system and on host systems where copies of the objects reside. Partial matching may be used to identify the pattern. If a first block contains a partial match to the pattern, logically adjacent blocks are scanned to determine whether the partial match of the first block is completed in logically adjacent blocks. Logically adjacent blocks can be associated with different objects.

11 Claims, 5 Drawing Sheets

Full match with malware signature:

Partial match with malware signature:

COMMONALITY FACTORING REMEDIATION

CROSS-REFERENCE TO RELATED APPLICATIONS

This application claims priority to co-pending U.S. Provisional Patent Application No. 61/075,854 for Commonality Factoring for Virus Scan filed Jun. 26, 2008, which is incorporated herein by reference for all purposes; and to co-pending U.S. patent application Ser. No. 12/242,866 for SYSTEM AND METHOD FOR ORCHESTRATING SERVICES, filed Sep. 30, 2008, which is incorporated herein by reference for all purposes. This application is related to co-pending U.S. patent application Ser. No. 12/493,139 for COMMONALITY FACTORING PATTERN DETECTION and filed concurrently herewith, which is incorporated herein by reference for all purposes; and co-pending U.S. patent application Ser. No. 12/493,148 for PARTIAL PATTERN DETECTION WITH COMMONALITY FACTORING and filed concurrently herewith, which is incorporated herein by reference for all purposes.

FIELD OF THE INVENTION

This invention relates generally to protecting information against viruses, and more particularly to systems and methods for efficiently processing information to detect viruses.

BACKGROUND OF THE INVENTION

This invention relates to a system and method for protecting computer files and/or objects against computer viruses, including malware. In the context of computers and machines, a virus is a self-replicating/self-reproducing-automation program that spreads by inserting copies of itself into other executable code or documents. Though the term "virus" may be defined as a type of malware (malicious software), it is common to use "virus" to refer to any kind of malware, including worms, Trojan horses, spyware, adware, etc.

Computer antivirus (AV) programs are commonly used to detect, clean, and remove computer viruses from infected objects such as data files. Such antivirus programs are ubiquitous and are run on nearly every personal computer and server, ranging from large corporations to home computers. One form of detection typically used is scanning of objects resident on a hosting computer system's storage device(s). Objects are scanned for the presence of an embedded virus, and the scanning may be signature-based or heuristic (such as watching for suspicious behavior). Signature-based virus scanning typically relies on signatures obtained from previously-identified viruses.

Generally speaking, antivirus applications provide two primary forms of protection. One form is On Access Scanning (OAS), which scans for malware whenever a file or data object is accessed. This provides for real-time protection using the most current and up to date malware signatures. Another form of protection is system scanning (SS) which scans disks and other data repositories for malware. Unlike OAS, which scans every time a file or data object is accessed, SS scans files and data objects while they are "at rest."

OAS and SS are typically used in combination. OAS protects the computer from threats as they occur. SS protects the computer from files which were infected before an AV signature was created for that particular malware. In other words, as new malware is created, there is a time lag between when the malware first appears and when the AV vendor responds with an appropriate signature and countermeasure. During such time, the malware may infect systems while the AV system is unaware of the infection. System scanning is used to perform an AV scan of previously created files and data objects.

System scanning, however, is typically resource-intensive and has a large impact on the performance of the host system for significant periods of time. In many cases, the performance impact is so large as to render the host system practically unusable while performing the scan. As a result, many users choose to disable the SS functionality. Others may choose to stop using their computers while the SS is running, thereby losing productivity. Because of this, enterprise IT (Information Technology) and security managers have difficulty enforcing their AV policies and thus, the enterprise may be placed at risk.

There is a need, therefore, for an improved method, article of manufacture, and apparatus for protecting information against viruses on a computer system.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
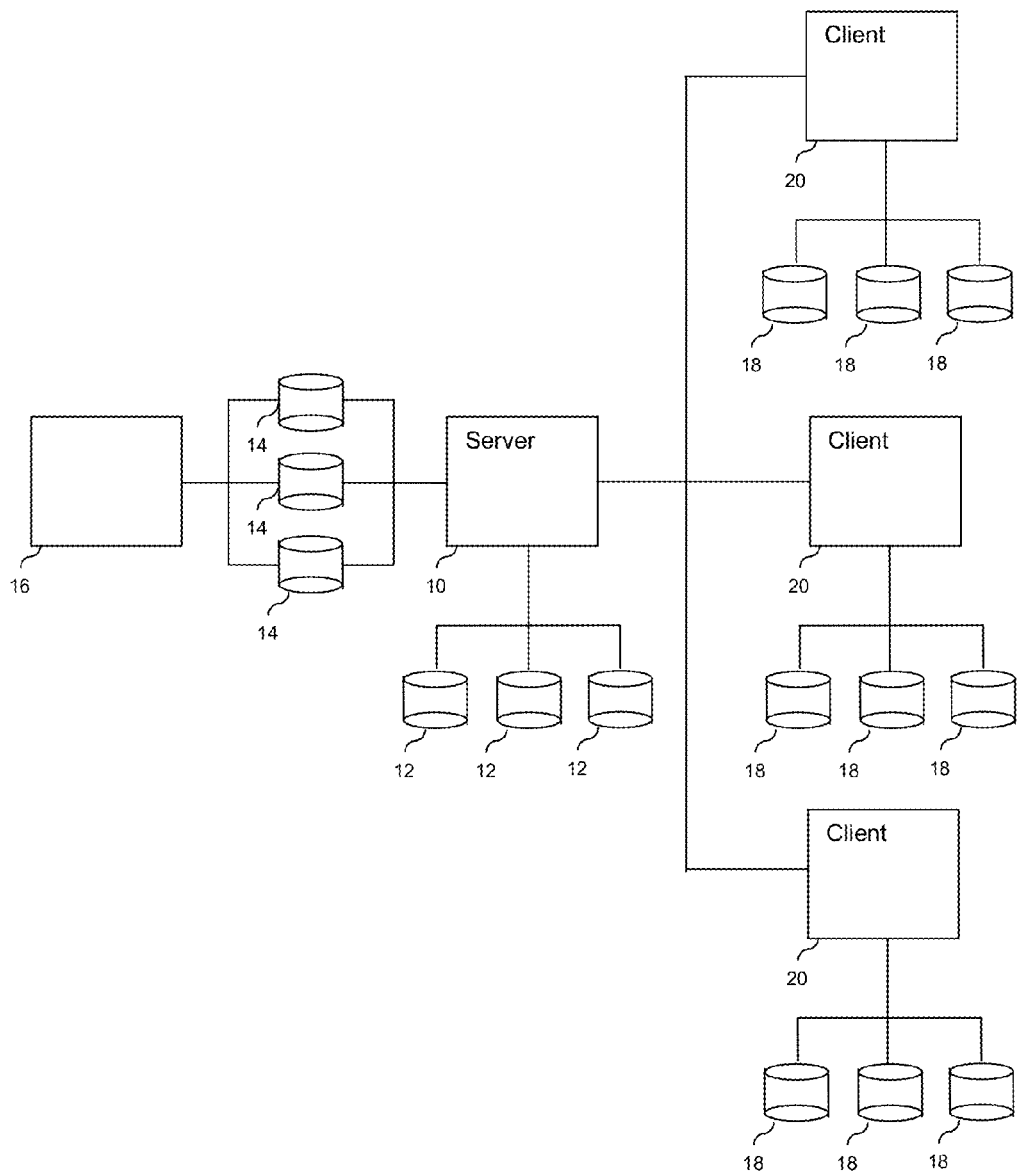
FIG. 1 is a diagram of an embodiment of a system in accordance with the invention.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium containing computer readable instructions or computer program code, or as a computer program product, comprising a computer usable medium having a computer readable program code embodied therein. In the context of this disclosure, a computer usable medium or computer readable medium may be any medium that can contain or store the program for use by or in connection with the instruction execution system, apparatus or device. For example, the computer readable storage medium or computer usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, infrared, optical, or electrical means system, apparatus or device for storing information. Alternatively or additionally, the computer readable storage medium or computer usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded in whole or in part through the use of a software development kit or toolkit that enables the creation and implementation of the present invention. In this specification, these implementations, or any other form that the invention may take, may be referred to as techniques. In general, the order of the steps of disclosed processes may be altered within the scope of the invention.

An embodiment of the invention will be described with reference to a computer system on which an information protection program such as an antivirus program executes, but it should be understood that the principles of the invention are not limited to this particular configuration. Rather, they may be applied to any system in which files or objects are stored, either on a local or remote device, and the device may comprise one or more storage devices. Although the information methods herein are described in terms of their application to protecting information from virus attacks, one skilled in the art will recognize that they are equally applicable to other cases for which it is desirable to detect unusual changes to objects or perform other analysis on them, such as searching for content in objects. Disclosed herein are a method and system to detect viruses and other malware in an efficient manner, and scour the enterprise for objects that are suspected to have been infected with malware.

Various systems in an enterprise may contain data files (or objects) of interest to an antivirus or other program, and such files may be transmitted to a repository, such as during a backup. FIG. 1 shows several possible configurations in which a program executing on a server 10 could be used to protect objects and the information they contain against viruses. A backup program executing on server 10 may receive data from client systems 20, which store objects on their storage devices 18 and may execute backup client programs that communicate with the backup program on server 10. Server 10 may communicate with clients 20 or any other device via a network or other means of communication, and store data from client systems 20 on its storage devices 12. In some embodiments, server 10 may store data on storage devices 14, which are accessible by a computer system 16. An information protection program in the form of an antivirus program may execute on server 10, or on the computer system 16. Server 10 or computer system 16 may be in communication with the Internet, and may be configured to receive virus definitions/updates from an antivirus vendor, though it should be understood that virus definitions/updates may be received by other means such as by physical media.

Other configurations are possible, such as executing the backup program or antivirus program on another computer system, backing up data to a SAN or NAS device (not shown), or storage devices attached to the backed-up computer systems. In some configurations, the backup may comprise several types of storage groups, such as a backup pool that uses online or near-line storage (such as hard drives) and an archive that uses off-line storage (such as tapes). The principles disclosed herein apply to any configuration of the backup. Computer system 10 may include a display and input devices for interaction with a user, or the user may interact with computer system 10 from a remote location.

It should be understood that where a storage device is shown, any type or number of storage devices may be used, such as disk drives, tape drives, content addressable storage, flash memory, optical drives, CD-Recordable drives, DVD-Recordable drives, non-volatile storage, etc. More than one storage device may be used, or only one storage device may be used, and different types may be used together.

System scanning may be performed by server 10 (or computer system 16, in some embodiments) on data stored in storage devices 12 (or storage devices 14). This has the advantage of removing the workload from the client systems 20, thus ensuring that system scanning will not interfere with the productivity of the users of client systems 20 or cause the client systems 20 to suffer reduced performance. However, simply centralizing all system scanning in this manner places tremendous resource demands on the server 10. In order to performing the system scanning within a reasonable period of time (similar to the time it would take to perform it on client systems 20), the server 10 would need to reproduce the amount of computing resources available on the client systems 20.

Commonality factoring may be used to reduce the amount of resources and time needed to perform centralized system scanning Space reduction techniques, such as deduplication or commonality factoring, may be performed on data. This may include identifying global redundant data (redundant data across all clients) and storing a single instance copy of the global redundant data on a server storage. The server 10 may perform commonality factoring deduplication on data in the storage 12. Commonality factoring, also known as deduplication, defines and computes atomic units of data, providing a mechanism for finding subsets of the data that are replicated across time or within and across data sets, and reducing or eliminating the replicated data. This may be used when backing up data, to reduce the amount of space required to store the data. The portions of data may be referred to as "blocks".

It may be desirable to use source deduplication, in which data at the source (such as a client 20) is deduplicated before being transferred to the server 10. Performing deduplication at the source of the data generally lowers the bandwidth required to transfer the data from the source to the server. In some embodiments, source deduplication may be more desirable in terms of scalability, efficiency, and availability.

Target deduplication, in which data is deduplicated at the target, may also be used. For example, server 10 may receive non-deduplicated data from a source (such as a client 20), store the non-deduplicated data in storage 12, and then perform deduplication on the data in the storage 12. This may be preferable when bandwidth is not an issue, and the storage 12 is capable of accommodating a large amount of redundant data.

In some embodiments, each client 20 may have its files backed up to a centralized backup repository at server 10 through the use of commonality factoring techniques (such as those implemented in EMC's Avamar product). The files selected for backup may be the same files as those selected for system scanning. Because commonality factoring stores only blocks of data that are unique, the amount of storage for backups is reduced, and if source deduplication is used, the bandwidth and time for backups may be reduced as well. System scanning may be performed at storage associated with server 10 (or system 16, as described). User satisfaction is improved due to the fact that the system scan is not consuming CPU and other resources on the user's host computer (such as client 20), which slows down the operation and responsiveness of the computer. Reliability may also be improved, since the duty cycle of the host computer is also reduced since the system scan is no longer being performed on the host computer.

Deduplication of redundant blocks of data may be performed on all data being backed up to the repository. This means that redundancies that occur across different computers can be eliminated, and the benefit can be particularly large as more and more computers back up data.

For example, consider an enterprise with 50,000 computers. If each computer were to be backed up using traditional methods, the amount of data would be huge, because many computers contain like or similar files and data objects. Commonality factoring identifies these redundancies and stores only a single instance of the data. Thus, if all 50,000 computers contained a copy of a 10 MB file and backed up this file, it would take 50 GB of storage. With commonality factoring, only a single instance of the file would be kept together with a small amount of metadata. This would represent a huge reduction in the amount of storage, bandwidth, and backup time required. The single instance of the 10 MB file together with the metadata would effectively represent 50,000 copies of the file and 50 GB of data. Deduplication may take place at the block level, with similar savings from eliminating redundancies.

Once this single instance of the data object is backed up, an AV scan, such as a system scan, may be performed. Scanning the deduplicated data repository could effectively be equivalent to scanning all 50,000 systems, thereby saving time, computing resources, bandwidth, energy (power/electricity), and wear on the host computers. The ability to perform AV scans on commonality factored blocks it makes it possible to scan one set of blocks that represent many times more sets of blocks in their original format. Similarly, performing other scanning, analysis, or processing on the deduplicated blocks makes it possible to perform such actions on one set of blocks that represent many times more sets of blocks in their original format.

Conventional system scanning is designed to be performed on files which are in their original format or in a compressed format. Most backup systems store their backup data in formats that are different from the original file's format. Often, multiple source files are backed up as a single file or object. For AV scanning to be effective, the AV application would have to be able to understand and decode the combined file format in order to effectively scan for and find viruses and other malware. This may be implemented by combining the AV application with the backup application, writing the AV application to understand the backup format, or providing appropriate views of the data, such as described in co-pending U.S. patent application Ser. No. 12/242,874 for ORCHESTRATED NON-DISRUPTIVE AUXILIARY SERVICES, filed Sep. 30, 2008, the disclosure of which is incorporated herein by reference for all purposes. A view may be considered to be access to data and metadata in a particular format, and may include appropriate metadata generated for that format. The view of a data set reflects the data and storage formats used by the application utilizing that view. The formats may include block, file, stream, or other appropriate format, and various application formats (e.g. text, binary, word processing, spreadsheet, etc.) may be used as well. The block format may be a disk block, deduplicated block, or other type of block. For example, the blocks may be retrieved to reconstitute a file that is then submitted to the AV application for scanning.

AV scans may look for malware by scanning files (and data objects) using one or more scanning methods:

Sequential scans—scan files in sequence.

Conditional scans—scan files and based on findings in certain sections scan other sections of the file.

Offset scans—scan files at specific offset locations.

The use of commonality factoring hinders the use of file scanning techniques. Commonality factoring divides files and data objects into sub-file blocks (which are smaller in size than the source data) and then stores these blocks in a repository. Because the blocks may be used to constitute multiple files and data objects, they may not be stored in a manner that reproduces the original data's format. This hinders conventional AV scanning, because the expected file or data structure is no longer present. As described herein, blocks could be retrieved to reconstitute a file that is submitted to the AV scanner. This has the advantage of centralizing AV scanning at the server 10 instead of performing AV scanning at the clients 20, but where multiple files are being scanned, may result in retrieving a given block multiple times to reconstitute files that use that block.

In performing offset scanning, the AV application typically retrieves a file and inspects a section of the file based on a fixed offset into the file. If the files have been rendered into deduplicated blocks, the offset technique will not function since the files either will not exist, or if they do, they will not be in their original format, which may invalidate the results from the offset scanning method. In some embodiments, offset information may be used to determine which of the blocks would contain the target location, and scan that block and location. Blocks that are logically adjacent to the block containing the target location may also be retrieved in order to facilitate the scan (for example, if the AV application is trying to scan past the end of the block).

In some embodiments, when a signature is detected in a block, it may be desirable to determine whether the location of the signature matches a location known to be associated with malware to which the signature relates. The location of the signature in known malware may be given relative to a fully constituted file; for example, as an offset. A file relative location for the detected signature may be computed and then compared to the location known to be associated with malware. In some embodiments, the file may be determined to be infected based on whether the locations match.

A logically adjacent block may be defined as a block that would precede or follow a given block if all of the blocks were arranged in canonical order, even if the blocks are not in canonical order at the time of selection. When blocks are ordered in their canonical order, their collective physical assembly exactly reconstructs the original source. These blocks are said to have physical adjacency and are ordered according to logical adjacency. When the blocks are reordered in a non-canonical order, their collective physical assembly does not exactly reconstruct the original source. In this case, the blocks are said to have physical adjacency but are not ordered according to logical adjacency. The first block of an assembly of blocks in canonical order can have only one logically adjacent block, which follows it, and no preceding block. Similarly, the last block of an assembly of blocks in canonical order can have only one logically adjacent block, which precedes it, and no following block. Any block other than the first and last block in the assembly of blocks in canonical order will have one logically adjacent block preceding it, and one logically adjacent block following it.

In some embodiments, the system may be configured to scan individual blocks in search of malware or performing other scanning, analysis, or processing. One common technique for finding malware is to look for malware "signatures," which may be described as bit patterns that provide telltale signs of infection. Because the files are no longer stored as files but as discrete blocks, the malware's signature may be split across two or more blocks. The blocks may be formed in an arbitrary manner, or using algorithms that are not transparent to the AV application, which would make it difficult to predict which blocks contain the relevant parts of the malware signature.

To overcome this, the blocks may be scanned for full or partial matches to the malware signature. If a full match is found within a block, then all the other relevant parts of the files that make use of the block may be identified. These files may then be disinfected or otherwise dealt with as infected files. It is possible, however, that the malware signature may be split across two or more blocks. To detect such signatures, the system may be configured to look for partial matches; i.e., matches of less than 100%.

In some embodiments, the system may be configured to look for 50% or better matches, and thus be able to find those files that have at least a 50% match to a malware signature. It should be understood that the threshold for finding a partial match may be set to a higher or lower level. Based on this, the system would then find and scan all the logically adjacent blocks to the block having the 50% or better match. All subsequent adjacent blocks that provide further or complete partial matches to the malware signature may be used to determine which files contain the infection. In some embodiments, all blocks may be scanned, keeping track of full or partial matches (with the threshold for finding a partial set to a desired level, such as 50%). After all blocks are scanned, the list of matches may be analyzed to determine possible infections. In some embodiments, when full or partial matches are identified, logically adjacent blocks may be immediately scanned to resolve the potential identification of an infection, before continuing to scan other blocks. This process is completed when all blocks are scanned.

Figure 2:
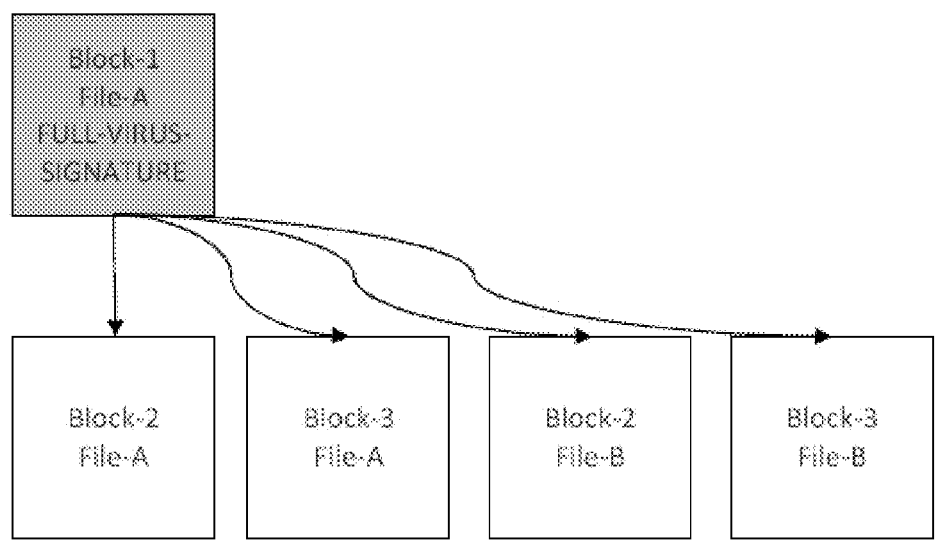
FIG. 2 is a diagram of an embodiment of a backup system in accordance with the invention.

FIG. 2 is a diagram illustrating full matching of a malware signature within a block. File-A and File-B each comprise three blocks. File-A and File-B have Block-1 in common, and all other blocks shown are unique. In this example, the complete malware signature is detected within Block-1. This means that File-A and File-B are both infected, because both files share a common and infected block (Block-1). Because the malware signature was fully detected in Block-1 and it is known that Block-1 is in common with more than one file, it is unnecessary to scan Block-1 more than once to conclude that File-A and File-B contain the malware signature.

Figure 3:
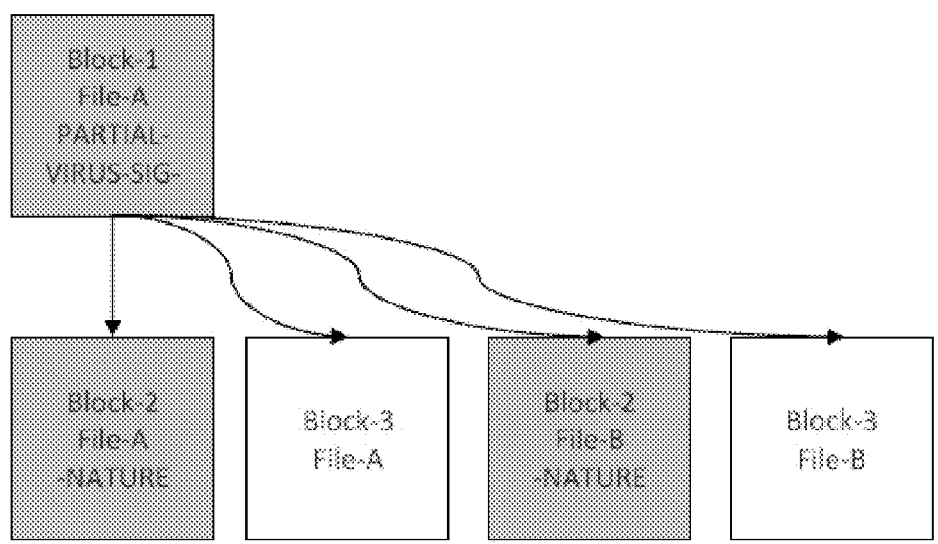
FIG. 3 is a flowchart of a method to backup information in accordance with the invention.

FIG. 3 is a diagram illustrating partial matching of a malware signature within a block. File-A and File-B each comprise three blocks. File-A and File-B have Block-1 in common, and all other blocks shown are unique. In this example, a partial malware signature is detected within Block-1. It is not possible at this point to conclude that either file is infected, because there was only a partial match of the malware signature. In order to determine if either file is infected, the remaining blocks must also be scanned for the remainder of the malware signature. Upon scanning the other blocks, the remainder of the malware signature is detected within Block-2 of File-A and Block-2 of File-B, and thus these blocks complete the partial match of Block-1. When Block-1 is analyzed with Block-2:File-A, the full malware signature is detected. Likewise, when Block-1 is analyzed with Block-2:File-B, the full malware signature is also detected. It may thus be concluded that File-A and File-B are infected. In this example, Block-1 was scanned only once.

Figure 4:
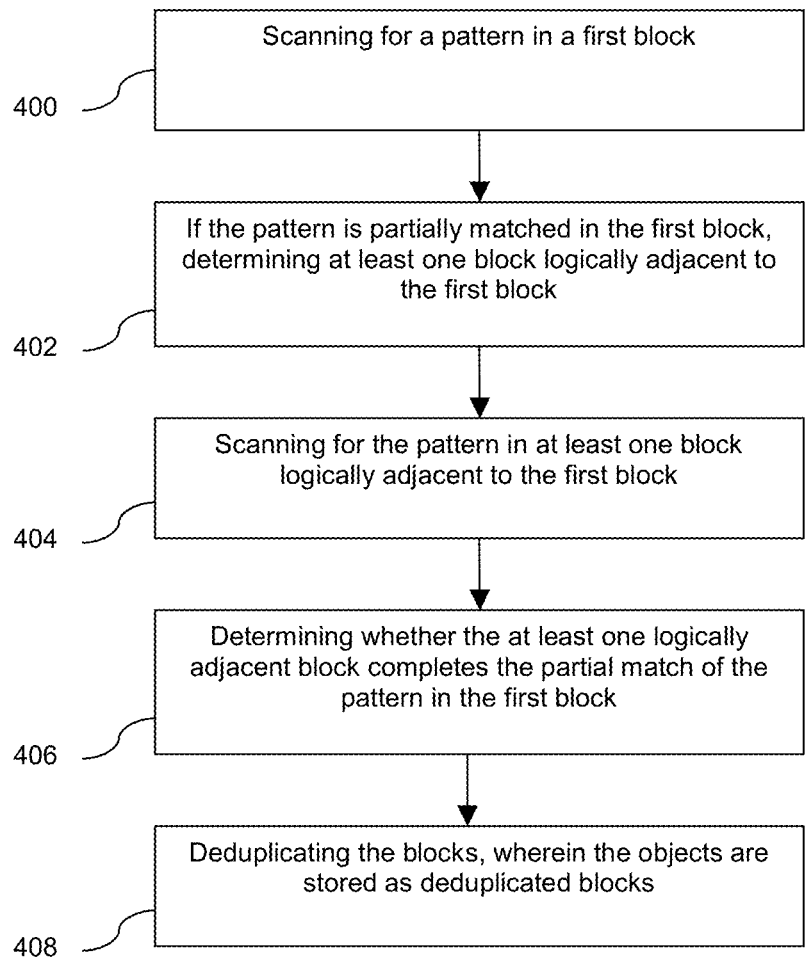
FIG. 4 is a flowchart of a method to restore information in accordance with the invention.

FIG. 4 illustrates a process flow with partial matching in accordance with the invention, comprising: scanning for a pattern in a first block in step 400, if the pattern is partially matched in the first block, determining at least one block logically adjacent to the first block in step 402, scanning for the pattern in at least one block logically adjacent to the first block in step 404, determining whether the at least one logically adjacent block completes the partial match of the pattern in the first block in step 406, and deduplicating the blocks, wherein the objects are stored as deduplicated blocks in step 408.

When blocks and files are identified as infected, they may be removed from the scan list and placed into a queue for further scanning and/or remediation. Such remediation may include quarantine, disinfection, or deletion. A similar approach may be used for other types of scanning, analysis, or processing, such as searching for content.

Figure 6:
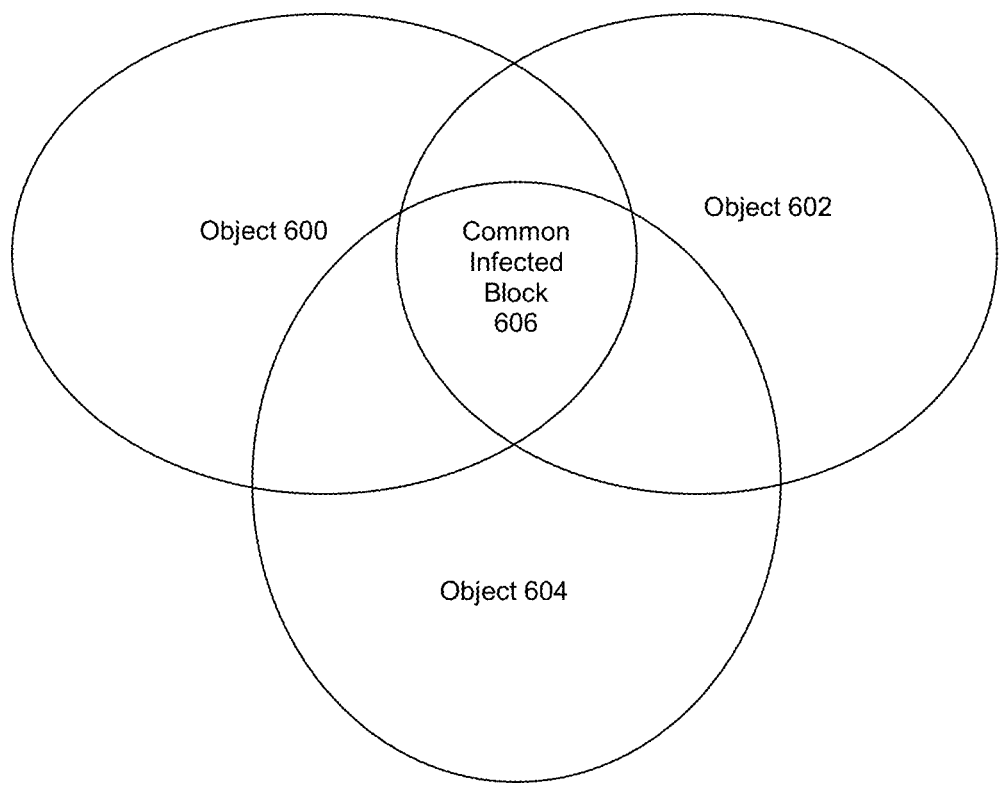
FIG. 6 is a flowchart of a method to backup information in accordance with the invention.

The remediation may affect the block containing the malware signature, or the remediation may affect the entire object associated with the block. For example, in some embodiments, remediation may delete the infected block, and leave the rest of the blocks associated with the object intact. In some embodiments, remediation may delete the infected block along with every other block associated with the object. In some embodiments, multiple objects may be associated with the infected block. Thus, in some embodiments, all blocks associated with all files associated with the infected block may be deleted. This is illustrated in FIG. 6. FIG. 6 shows Object 600, Object 602, and Object 604 have a Common Infected Block 606. Depending on remediation policy, Common Infected Block 606 may be remedied without impacting Object 600, 602, or 604. Other remediation policies may dictate that Object 600 be remedied along with Common Infected Block 606 without impacting Object 602 or 604, and so on.

Policies may be invoked based upon the detection of a malware signature. Such policies may be remedial policies, which may require disinfection. For example, if a malware signature is found in a repository of blocks, a policy may require a remediation be performed on the repository. Further, a policy may require that the same remediation be performed on all clients which contributed to the repository of blocks.

Figure 5:
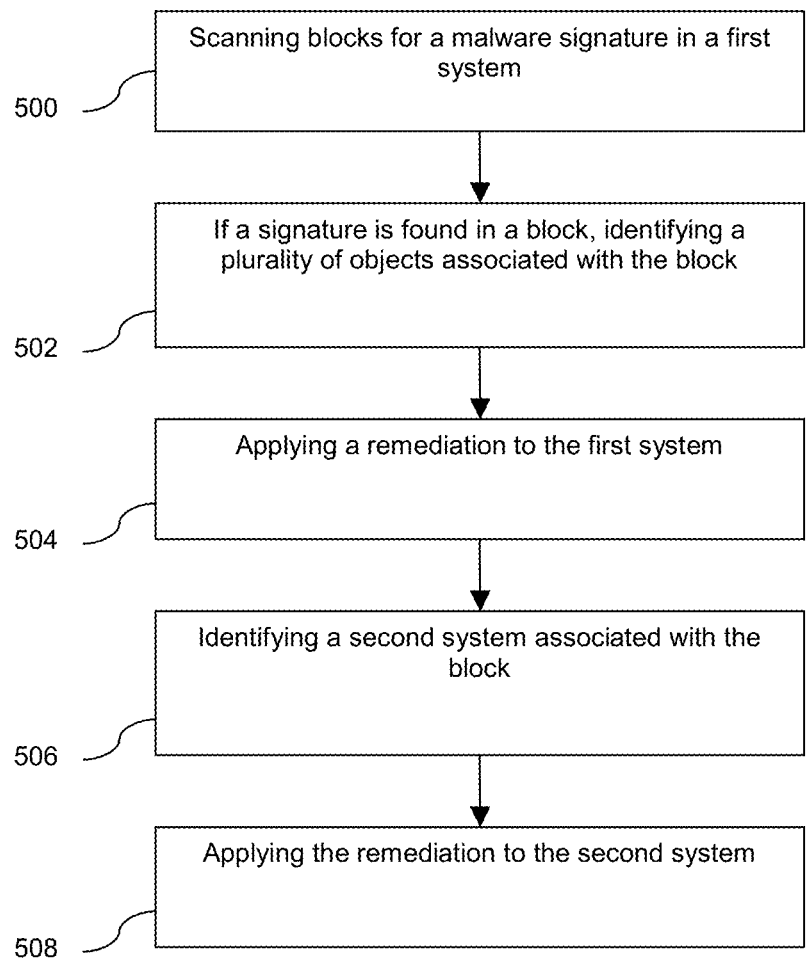
FIG. 5 is a flowchart of a method to backup information in accordance with the invention.

FIG. 5 illustrates how commonality factoring remediation may be applied to different clients in some embodiments of the invention. In step 500, blocks are scanned for a malware signature in a first system. In step 502, if a malware signature is found in a block, a plurality of objects associated with the block are identified. In step 504, a remediation is applied to the first system. In step 506, a second system associated with the block is identified. In step 508, a remediation is applied to the second system. Thus, malware or viruses may be scanned for in a repository system without consuming the resources of clients. Only when malware or viruses are detected in a repository will clients have to perform remediation.

It may still be preferable for clients to perform their own virus scan. Repositories contain only snapshots of client data. In other words, the repository may contain out-dated or incomplete data. Thus, in some embodiments, it may be beneficial for clients to perform the scan on client data. The present invention allows for clients to perform virus scans less frequently since Another policy may require additional scans. For example, if a malware signature is detected in a block, a policy may require that other blocks be scanned. These blocks may be related to the block containing the detected signature, or otherwise have a higher chance of containing the malware signature.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

Though the above has been described with reference to the term "backup" for illustrative purposes, the principles disclosed herein are equally applicable to all forms of data duplication. These forms of data duplication include replication and archiving, among others. Similarly, although the above has been described with reference to "antivirus" for illustrative purposes, the principles disclosed herein are equally applicable to all forms of scanning, analysis, and searching for content. It should be understood that the term "scan" does not necessarily require obtaining and examining to occur contemporaneously, and due to caching or other configurations, examination may take place some time after data has been provided.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The present embodiments are to be considered as illustrative and not restrictive, and the invention is not to be limited to the details given herein. It is therefore intended that the disclosure and following claims be interpreted as covering all such alterations and modifications as fall within the true spirit and scope of the invention.

What is claimed is:

1. A method of processing objects stored as blocks in a data storage system, comprising:
    scanning blocks for a malware signature in a first system, wherein the first system includes a storage device, and wherein the blocks are stored and generated by a backup application in a backup application format, wherein the backup application format is different from original data format, wherein the blocks are deduplicated blocks;
    when a signature is found in a block, identifying at least a first object in the first system and a second object in a second system that share the block as commonality, wherein at least the block is needed to reconstitute the first object and the second object, and wherein the first object and the second object have at least one of different file content, different file types, or different file sizes;
    applying a remediation to the first system; and
    applying the remediation to the second system.

2. The method as recited in claim 1, wherein remedying the first system includes remedying the first system based on a remediation policy.

3. The method as recited in claim 1, wherein remedying the second system includes remedying the second system based on a remediation policy.

4. The method as recited in claim 1, wherein scanning blocks for a pattern includes offset scanning.

5. The method as recited in claim 1, wherein scanning blocks for a pattern includes sequential scanning.

6. The method as recited in claim 1, wherein remedying the second system includes quarantining at least the second object in the second system.

7. The method as recited in claim 1, wherein remedying the second system includes deleting at least the second object in the second system.

8. The method as recited in claim 1, wherein remedying the second system includes disinfecting at least the second object in the second system.

9. The method as recited in claim 1, wherein the first system is connected to the second system by a network.

10. A system for processing data, comprising:
    a first system;
    a second system;
    a processor configured to scan blocks for a malware signature in the first system, wherein the blocks are stored and generated by a backup application in a backup application format, wherein the backup application format is different from original data format, wherein the blocks are deduplicated blocks, when a signature is found in a block, identify at least a first object in the first system and a second object in a second system that share the block as commonality, wherein at least the block is needed to reconstitute the first object and the second object, and wherein the first object and the second object have at least one of different file content, different file types, or different file sizes, apply a remediation to the first system, and apply the remediation to the second system.

11. A computer program product for processing data, comprising a non-transitory computer readable medium having program instructions embodied therein for:
    scanning blocks for a malware signature in a first system, wherein the blocks are stored and generated by a backup application in a backup application format, wherein the backup application format is different from original data format, wherein the blocks are deduplicated blocks;
    when a signature is found in a block, identifying at least a first object in the first system and a second object in a second system that share the block as commonality, wherein at least the block is needed to reconstitute the first object and the second object, and wherein the first object and the second object have at least one of different file content, different file types, or different file sizes;
    applying a remediation to the first system; and
    applying the remediation to the second system.

* * * * *